Nov. 29, 1932.  E. A. MURPHY ET AL  1,889,102
PROCESS AND DEVICE FOR THE DIRECT PRODUCTION OF FILAMENTS AND THREADS
Filed May 26, 1930
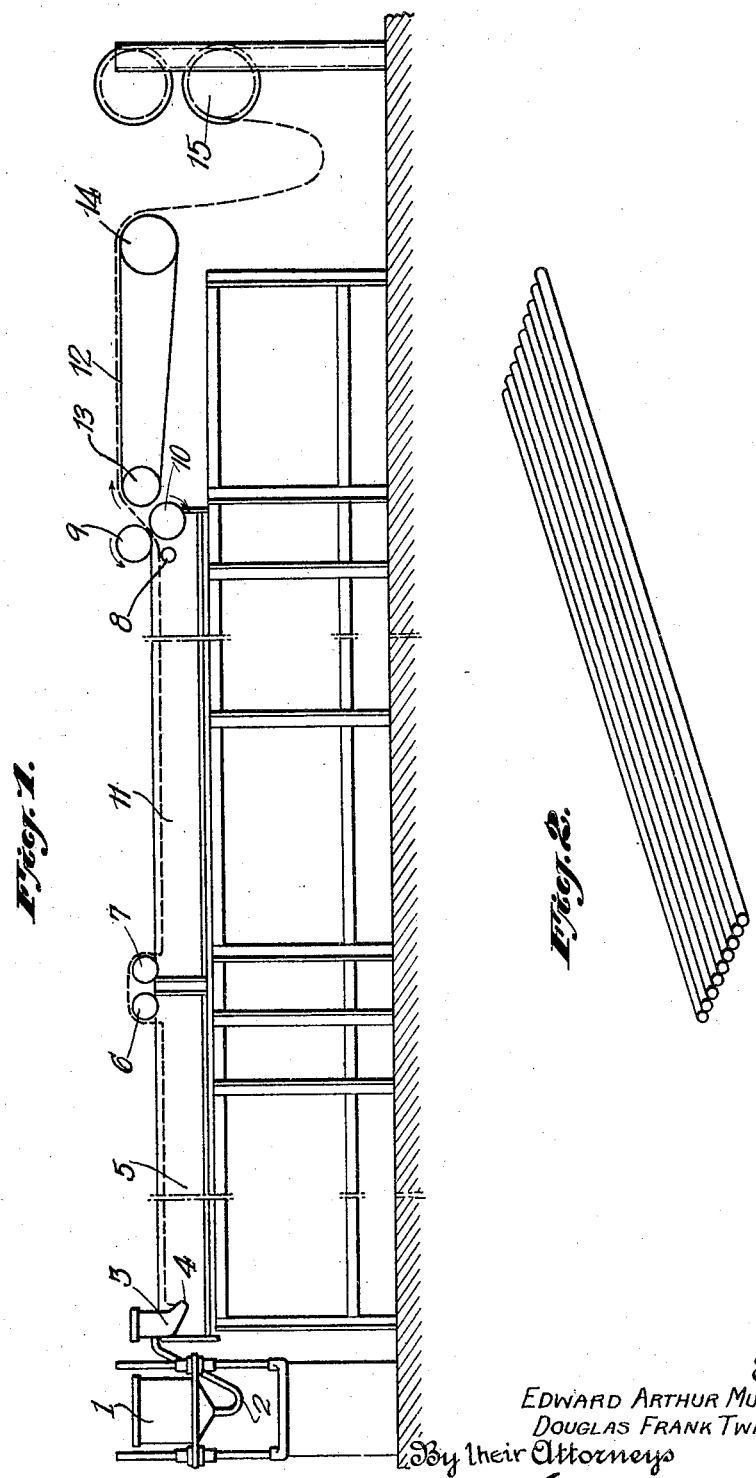
Inventors
EDWARD ARTHUR MURPHY and
DOUGLAS FRANK TWISS
By their Attorneys Patented Nov. 29, 1932

1,889,102

UNITED STATES PATENT OFFICE

EDWARD ARTHUR MURPHY AND DOUGLAS FRANK TWISS, OF SUTTON COLDFIELD, ENGLAND, ASSIGNORS TO DUNLOP RUBBER COMPANY LIMITED, A BRITISH COMPANY

PROCESS AND DEVICE FOR THE DIRECT PRODUCTION OF FILAMENTS AND THREADS

Application filed May 26, 1930, Serial No. 455,496, and in Great Britain June 13, 1929.

This invention relates to a process for the production of filaments and threads from aqueous dispersions of the kinds hereinafter specified and is an improvement in or modification of the manufacture described and claimed in British Patent No. 311,844. In the specification of said patent we have described and claimed a process for the manufacture of filaments, threads or tubes of rubber or like material from aqueous dispersions of the kinds hereinafter specified wherein the dispersions aforesaid are caused to flow through orifices or jets of any desired shape into contact with a liquid dehydrating and setting medium operating partly or entirely under continuous penetrative osmotic action.

The object of the present invention is to produce flat or tape like filaments or threads such as, for example, suitable for use in golf ball manufacture direct from partially set filaments, threads or tubes of rubber or the like material produced by the process of said British patent.

With these and other objects in view which will appear in the following description, the invention comprises the method, apparatus and product defined in the following specification and claims.

The various features of the invention are illustrated in the accompanying drawing in which—

Fig. 1 is a diagrammatic side elevation of an apparatus embodying our invention, and Fig. 2 is a perspective view of a modified filament in one stage of formation.

According to the invention of said British patent an aqueous dispersion is caused to flow through nozzles of any desired shape into contact with a liquid dehydrating and setting medium operating partly or entirely under continuous penetrative osmotic action such as is described and claimed in our application Serial No. 309,353.

According to our present invention it has now been ascertained that flat or tape-like filaments or threads such, for example, as are suitable for use in golf ball manufacture can be produced according to said main patent through even spaced rollers which are preferably rubber coated.

The aqueous dispersion may be derived from natural or artificial aqueous dispersions of rubber, balata, gutta-percha or similar vegetable resins or artificial dispersions of coagulated rubber, vulcanized rubber, waste or reclaim rubber or mixtures of any of the aforesaid dispersions in concentrated and/or compounded condition or, alternatively, in a condition obtained by compounding and the concentrating, the compounding ingredients comprising the usual additions such as fillers, reinforcing agents, vulcanizing agents, accelerators and softeners.

The consistency of the dispersions such as concentrated compounded latex is adjusted to that of a fluid cream. In accordance with said British patent this cream is supplied from a container 1 through a pipe 2 to a feed tank 3 and allowed to issue through a jet 4 of any desired cross sectional shape or area, immersed in a suitable dehydrating and setting bath 5. The feed pipe 2 and jet 4 may be cooled by a water jacket or other suitable cooling means. The "fluid head" of the cream relative to the jet orifice is sufficient to cause a slight positive flow from the jet and as the liquid in the dehydrating and setting bath is chosen so as to have a higher specific gravity than that of the latex cream, the latter at the orifice of the jet tends at once to rise continuously in a vertical direction in the heavier medium. The distance of the level of the jet below the free surface of the bath is adjusted to a suitable magnitude for the purpose among others, of ensuring a satisfactory degree of "setting" of the vertically rising cream before it reaches the surface. The effective hydrostatic pressure may additionally be adjusted by maintaining a suitable degree of pressure below atmospheric pressure in the container.

It is of importance to note that the threads or tubes so produced may be of smaller cross section than the corresponding dimensions of the jet. The cross sectional area of the thread or tube can be varied to some extent by varying the distance of the orifice below the surface of the bath.

The bath liquid is preferably a warm concentrated solution of a saline or other very soluble substance. The bath liquid of this type also has its specific gravity sufficiently high to supply the necessary upward force on the cream at the mouth of the orifice. It is apparently the osmotic effect of such a warm concentrated solution which leads to the dehydrating and setting action upon the compounded concentrated rubber latex issuing from the jet. The temperature, concentration and acidity of the bath may be controlled to effect the required rate and degree of setting and dehydration so that the column of cream attains a condition suitable for the subsequent shaping operation. The thread or filament is drawn through the dehydrating and setting bath 5 and then onto rollers 6 and 7 and passed into a washing tank 11 containing hot water. It is drawn from the opposite end of the washing tank by means of a roller 8.

In carrying out the process of the present invention the partially set filament, thread or tube, produced according to said main patent, subsequent to leaving the dehydrating and setting bath and subsequent or prior to washing, is passed between even speed rollers which are preferably rubber coated and wherein the pressure or nip between the aforesaid rollers is capable of adjustment, thus enabling the thickness of the flat thread so produced to be controlled.

In the form of embodiment shown in Fig. 1 these even speed rollers are shown at 9 and 10 engaging the thread between them as it issues from the washing tank 11. It is then received on a conveyer belt 12 carried on drums 13 and 14 and is then wound on a reel 15.

When surface marking is desired, for example, to prevent slipping of thread during the winding operation in the manufacture of golf balls, it may be imparted by passing the partially set filament, thread or tube between suitably embossed or engraved rollers. Alternatively or additionally, slipping may be prevented by applying a powder such as clay or whiting deficient in lubricating power to the thread in the undried condition, for example, by dusting thereon after leaving the tank 11.

When a tape of considerable width is required, a composite tape formed of a number of threads 16, as shown in Fig. 2 and as described and claimed in said main patent, can be passed between the rollers, thereby increasing its width and ensuring consolidation of the individual threads. After the partially set thread or filament has passed between the rolls 9 and 10, setting may be completed and the thread or filament be vulcanized or cured in any suitable manner.

The flat or tape like thread or filament made in accordance with the present invention is substantially free from the sharp edges and irregularities usually to be found in material produced by the use of a cutting knife and lapping cloth.

What we claim is:

1. A method of making flat or tape like filaments or threads of rubber material from aqueous dispersions which comprises causing the dispersions to flow in a stream into contact with a liquid dehydrating and setting medium having continuous penetrative osmotic action therein partially to set the stream of rubber material to a thread or tube, and thereafter pressing the partially set films, threads or tubes to a predetermined thickness by even speed rolling pressure applied to opposite sides of the film thread or tube.

2. A method claimed in claim 1, and the step of applying powder deficient in lubricating power to the thread in the undried condition.

3. The process as claimed in claim 1 wherein the cross-sectional area of the thread or tube prior to the application of pressure is controlled by controlling the distance below the surface of the dehydrating and setting liquid at which the stream enters the liquid.

4. Apparatus for the manufacture of flat or tape like filaments or threads of rubber material comprising a bath containing a dehydrating and setting medium for dispersions of rubber material, a fluid supply means having an orifice opening into said bath below the surface of said bath, and even speed rollers spaced apart less than the diameter of said orifice and between which a partially set thread of said rubber material from said bath is passed.

5. Apparatus as claimed in claim 4 comprising a tank of hot water to receive thread after it has passed through said bath.

6. Apparatus as claimed in claim 4 wherein the even speed rollers are rubber coated.

7. Apparatus as claimed in claim 4 wherein the nip between the aforesaid rollers is capable of adjustment.

8. Apparatus as claimed in claim 4 wherein the distance of the orifice, nozzle or jet below the surface of the dehydrating and setting liquid is capable of adjustment.

9. Apparatus as claimed in claim 4 wherein several orifices, nozzles or jets are fed from a common reservoir.

10. A flat thread of rubber the sides of which are joined by rounded edges.

11. A flat thread of rubber the sides of which are rounded and the flat surfaces of which are embossed.

In witness whereof we have hereunto set our hands.

EDWARD ARTHUR MURPHY.
DOUGLAS FRANK TWISS.